(12) United States Patent
Doppke et al.

(10) Patent No.: US 10,567,415 B2
(45) Date of Patent: Feb. 18, 2020

(54) VISUALIZATION OF NETWORK THREAT MONITORING

(71) Applicant: Arbor Networks, Inc., Burlington, MA (US)

(72) Inventors: Jeffrey Doppke, Canton, MI (US); Joshua M. Fields, Ypsilanti, MI (US); Christopher C. Cassell, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 169 days.

(21) Appl. No.: 15/266,804

(22) Filed: Sep. 15, 2016

(65) Prior Publication Data

US 2018/0077189 A1    Mar. 15, 2018

(51) Int. Cl.
| | | |
|---|---|---|
| *H04L 29/06* | (2006.01) | |
| *G06F 21/57* | (2013.01) | |
| *G06F 21/60* | (2013.01) | |

(52) U.S. Cl.
CPC ........ *H04L 63/1433* (2013.01); *G06F 21/577* (2013.01); *G06F 21/604* (2013.01); *H04L 63/20* (2013.01); *H04L 63/1408* (2013.01)

(58) Field of Classification Search
CPC .... H04L 63/1433; H04L 63/20; G06F 3/0482
See application file for complete search history.

(56) References Cited

U.S. PATENT DOCUMENTS

| | | | | |
|---|---|---|---|---|
| 6,597,957 B1* | 7/2003 | Beakley | ............. | H04L 43/0817 700/11 |
| 6,704,874 B1* | 3/2004 | Porras | .................. | H04L 41/142 709/224 |
| 9,516,053 B1* | 12/2016 | Muddu | ............... | H04L 63/1425 |
| 2008/0037432 A1* | 2/2008 | Cohen | ................... | H04L 41/142 370/241 |
| 2009/0182866 A1* | 7/2009 | Watanabe | ........... | G06F 11/3495 709/224 |
| 2011/0225622 A1* | 9/2011 | Pearcy | .................. | H04L 43/028 726/1 |
| 2013/0275576 A1* | 10/2013 | Hinz | ....................... | H04L 43/04 709/224 |
| 2016/0164905 A1* | 6/2016 | Pinney Wood | ... | G06F 17/30958 726/25 |
| 2016/0173446 A1* | 6/2016 | Nantel | ................ | H04L 63/1425 726/11 |

OTHER PUBLICATIONS

FortiDDoS Web-based Manager v3.2 Reference Guide, Fortinet Inc., Mar. 27, 2013. (Year: 2013).*
Fortinet Product Documentation for Status Dashboard, Fortinet Inc., https://help.fortinet.com/fweb/551/Content/FortiWeb/fortiweb-admin/status_dashboard.htm; available at least on Jun. 18, 2016. (Year: 2016).*

* cited by examiner

*Primary Examiner* — Chau Le
*Assistant Examiner* — Vance M Little
(74) *Attorney, Agent, or Firm* — Locke Lord LLP; Scott D. Wofsy; Christopher J. Capelli (57) ABSTRACT

A method to monitor a network is provided which includes identifying a time associated with detection of each occurrence of the network threats and generating a graphical user interface that includes a display of a time series graph that corresponds to a selected time period and an interactive popup window indicating certain details associated with a user selected network threat.

8 Claims, 6 Drawing Sheets

VISUALIZATION OF NETWORK THREAT MONITORING

FIELD OF THE INVENTION

The present disclosure relates generally to computer network monitoring, and more specifically to visualization of monitoring of threats to a network.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

Due to growing problems associated with security threats to networks that exploit the Internet, network providers monitor for network threats while monitoring traffic flow. For example, networks and network devices are increasingly affected by the damages caused by Denial of Service ("DoS") attacks. A DoS attack is defined as an action aimed at a computer network or system by an offensive external device that prevents any part of the network from functioning in accordance with its intended purpose. This attack may cause a loss of service to the users of the network and its network devices. For example, the loss of network services may be achieved by flooding the system to prevent normal response to legitimate requests. The flooding may consume all of the available bandwidth of the targeted network, or it may exhaust the computational resources of the targeted system.

Other network security threats include Trojan horse attacks that may be embedded in harmless software, viruses that can reproduce themselves and attach to executable files, worms that can spread via stored collections of e-mail addresses, and logic bombs that can remain dormant until triggered by an event (e.g., a date, user action, random trigger, etc.).

Network monitoring produces large amounts of information about network threats and traffic flow. For example, thousands of network threat events related to different types of violations can be detected in an hour time period. Correlations may exist between characteristics of the different threats and characteristics of traffic flow. Administrators supervising a network can observe data output by network monitors monitoring the network, and make decisions about operation of the network based on their observations. However, due to the vast amount of data related to characteristics of network threats and traffic flow, the administrators' abilities to make correlations and informed decisions can be limited.

Such conventional methods and systems have generally been considered satisfactory for their intended purpose. However, there is still a need in the art for improved tools that present information conducive to recognition of relationships and associations between characteristics of suspicious network traffic as well as network traffic flow. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a system that monitors a network. An information processing system is provided that includes a processor and a memory device coupled to the processor, the memory device containing a set of instructions that, when executed by the processor, cause the processor to perform operations including receiving traffic metric data indicating measurements related to a characteristic of network traffic flowing in a network and identifying network threats in intercepted traffic of the network traffic. The operations further include identifying a time associated with detection of each occurrence of the network threats and generating a graphical user interface having a GUI that includes a display of a time series graph that corresponds to a selected time period. The display includes a network traffic plot and an alert plot adjacent to the network traffic plot. The network traffic plot indicates a characteristic of network traffic relative to a timeline displayed along a first axis. The alert plot includes alert indicators, wherein each alert indicator is associated with detection of a network threat and aligned relative to the timeline based on the time identified for each occurrence of the detected network threats.

In accordance with further aspects of the disclosure a method of network monitoring includes receiving traffic metric data indicating measurements related to a characteristic of network traffic flowing in a network, identifying network threats in intercepted traffic of the network traffic, identifying a time associated with detection of each occurrence of the network threats, and generating a graphical user interface having a GUI that includes a display of a time series graph that corresponds to a selected time period. The display includes a network traffic plot and an alert plot adjacent to the network traffic plot. The network traffic plot indicates a characteristic of network traffic relative to a timeline displayed along a first axis. The alert plot includes alert indicators, wherein each alert indicator is associated with detection of a network threat and aligned relative to the timeline based on the time identified for each occurrence of the detected network threats.

In addition, in accordance with aspects of the disclosure, a non-transitory computer readable storage medium and one or more computer programs embedded therein are provided. The computer programs includes instructions, which when executed by a computer system, cause the computer system to receive traffic metric data indicating measurements related to a characteristic of network traffic flowing in a network, identify network threats in intercepted traffic of the network traffic, identify a time associated with detection of each occurrence of the network threats, and generate a graphical user interface having a GUI that includes a display of a time series graph that corresponds to a selected time period. The display includes a network traffic plot and an alert plot adjacent to the network traffic plot. The network traffic plot indicates a characteristic of network traffic relative to a timeline displayed along a first axis. The alert plot includes alert indicators, wherein each alert indicator is associated with detection of a network threat and aligned relative to the timeline based on the time identified for each occurrence of the detected network threats.

BRIEF DESCRIPTION OF THE DRAWINGS

The accompanying appendices and/or drawings illustrate various non-limiting, example aspects in accordance with the present disclosure.

DETAILED DESCRIPTION OF CERTAIN EMBODIMENTS

Figure 1:
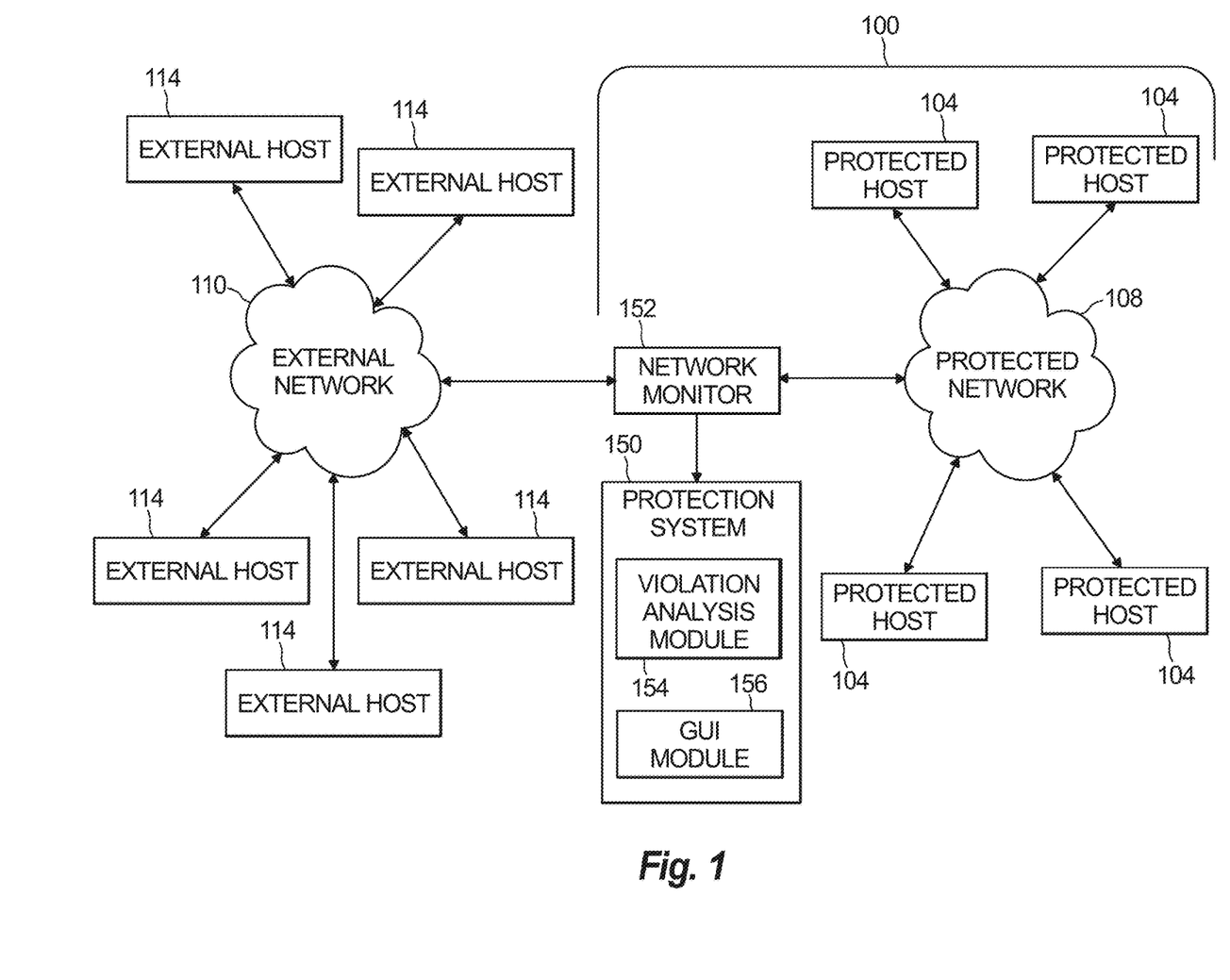
FIG. 1 illustrates a block diagram of an exemplary network communications system having a protection system, in accordance with the present disclosure.

Reference will now be made to the drawings wherein like reference numerals identify similar structural features or aspects of the subject disclosure. For purposes of explanation and illustration, and not limitation, a block diagram of an exemplary embodiment of a protected network environment in accordance with the disclosure is shown in FIG. 1 and is designated generally by reference character 100. Other embodiments of the protected network environment 100 in accordance with the disclosure, or aspects thereof, are provided in FIGS. 2-6, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

The present embodiments relate to a method, apparatus and system to monitor network performance, including graphically and interactively displaying network data associated with network flow and detected threats using a common timeline. The present method can collect relevant data from various network perspectives and store the data in a repository. Network perspectives may comprise different endpoints or middle-points within a computer network. The collected data may be analyzed to better understand network traffic behavior and/or proactively identify potential malicious behavior.

Turning now descriptively to the drawings, in which similar reference characters denote similar elements throughout the several views, FIG. 1 illustrates relationships between the protected network environment 100, protection system 150, network monitor 152, protected network 108 having associated protected hosts 104, and external network 110 having associated external hosts 114.

Protected hosts 104 and external hosts 114 can include computing devices, such as servers (e.g., generic; web; DNS; Mail; VOiP; VPN; RLogin; and file servers), laptops, desktop computers, tablet devices, mobile phones, mobile computing devices, video games systems, televisions, embedded computer devices that are embedded in other devices, such as appliances, tools, vehicles, or consumer electronics, and other similar devices and systems having network connectivity.

The network monitor 152 monitors network traffic between the external hosts 114 and the protected hosts 104 via the external network 110, which can include the Internet, and the protected network 108. The protection system 150 analyzes output from the network monitor 152 and generates a graphical user interface (GUI) that provides a graphical visualization of characteristics of the network traffic and detected threats.

The protected network 108 can include, for example, an intranet, a local area network (LAN), and/or a wide area network (WAN). In examples, the protected network 108 can be an enterprise network, such as a school network, business network, and government network, to list a few examples, that can connect to the Internet. The external network 110 can include, for example, the Internet, an intranet, a LAN, and/or a WAN.

In embodiments, the protected network 108 is monitored by a network monitor 152 and protected by a protection system 150. In embodiments, the protection system 150 and network monitor 152 are located between the external network 110 and the protected network 108. In other embodiments, the protection system 150 and network monitor 152 are located within the external network 110 or protected network 108. The protection system 150 and network monitor 152 can be located at a network edge (inside or outside of the protected network 108) or deeper within the protected network 108.

The network monitor 152 can monitor inbound (into the protected network 108) and/or outbound (from the protected network 108) network traffic, which can include intercepting the traffic. The network monitor 152 can include physical and/or virtual components that perform passive or active network monitoring. Passive network monitoring includes measuring network traffic without injecting test packets into the network traffic, whereas active network monitoring includes injecting test packets into the network traffic that increase the volume of network traffic and measuring network behavior associated with the injected traffic. Passive network monitoring can be performed, for example by a sniffer, a netflow capable device, or a component built into a network device, such as a router, switch, or end node host that use techniques, such as remote monitoring (RMON) and simple network monitoring protocol (SNMP). Examples of built-in devices include test access points (TAPs) and switch port analyzer (SPAN) ports. Network monitoring can further be provided by flow export capabilities found in many routers. One or more portions of the network monitor 152 can be integrated with the protection system 150, and one or more portions of the network monitor 152 can be external to the protection system 150. The network monitor 152 can be distributed at one or more locations to intercept the network traffic, which can include different locations of the protected network 108.

The network monitor 152 can output measurements of traffic to the protection system 150 as traffic metric data. The traffic metric data can include volumetric data related to the traffic flow. The volumetric data can be associated with total traffic flow in either direction, inbound or outbound, to or from the protected network 108, or can be associated with particular protected hosts 104 or external hosts 114 or groups of such hosts.

The network monitor 152 further includes one or more physical and/or virtual alert components that detect alert conditions associated with the traffic measurements that indicate an attack has begun, or that a new stage of an attack has been detected, and output corresponding alert data to the protection system 150.

In embodiments, upon detection of an alert condition, the network monitor 152 alerts the protection system 150 and provides the protection system 150 with alert data and access to a copy of intercepted network traffic. The alert data associated with an alert detection can include, for example, a timestamp, direction of the associated traffic (inbound or outbound), and/or source or destination information (e.g., address of a host or port).

The copied intercepted network traffic can be obtained, for example, over a predetermined time interval after the alert condition was detected, or after the alert condition is no longer detected. The network monitor 152 can provide the copy of intercepted network traffic to the protection system 150 or store it in a storage area accessible to the protection system 150, such as a storage medium of the protection system 150. In either case, the protection system 150 receives the copy of the intercepted network traffic either by transmission form the network monitor 152 or by retrieval from the storage area.

Additionally, the protection system 150 can include a central processing unit (CPU), random access memory (RAM), and a storage medium, which can be connected through buses and used to further support the processing of the received network traffic data, e.g., packets or flows. Programmable instructions can be stored in the storage medium and executed by the CPU to cause the CPU to perform operations described herein. The storage medium can also store analyzing criteria, such as predefined filter rules associated with one or more network policies. An example analyzing criterion can include a requirement that a connection that not exceed a predefined number of bytes per second, e.g., 100K bytes per second.

The protection system 150 further includes a violation analysis module 154 and a GUI module 156, which are software modules formed of programmable instructions that are executable by the CPU to cause the CPU to perform the functions of the disclosure.

The alert data and copy of intercepted network traffic is received by the violation analysis module 154. The term "receive" herein is intended to be interpreted broadly to include acquire, access, retrieve, read, obtain, or the like.

The violation analysis module 154 analyzes the copied intercepted network traffic and/or the traffic metric data associated with each alert to categorize each occurrence of a network threat. A network threat can be categorized, for example, as a violation of a particular network policy, a confidence level, geographic location of a source or destination of network traffic associated with the attack, and/or an authenticated user, department or group targeted within the protected network.

The policy violation can be detected, for example based on signature information determined by the violation analysis module 154 from the copy of intercepted traffic and/or the alert data. Signature information may refer to one or more patterns of text or bytes within a packet or flow that match a predetermined pattern. Signature information can also refer to a checksum computed from content in one or more packets or flows. For example, policy violations can be determined by comparing the signature information to rules associated with the one or more network policies for network communication. As previously stated, the rules of these network policies can be stored in one or more storage areas, such as the storage medium of the protection system 150. Categorization of the particular network threat, e.g., the network policy that was violated, can be output by the violation analysis module 154 as violation data.

Examples of violations that can be identified by signature information include: an attacker scanning a network looking for vulnerabilities; an attacker delivering malware to one or more places on the network; an attacker installing and executing malware that communicates to external hosts; unusual movement or traffic between hosts in the protected network; an attacker exfiltrating private data from the protected network; and an attacker logging into an unexpected system.

The violation analysis module 154 can determine, for example, a standard threat identification (e.g., common vulnerabilities and exposures-identification (CVE-ID) that references publicly known information-security vulnerabilities and exposures as identified by the National Cybersecurity federally funded research and development center (FFRDC)). The threat identification can be included with the violation data.

In addition, the violation analysis module 154 can determine a severity level of a threat (e.g., high, medium, low) associated with the alert. The severity level can be provided with the violation data or based upon, for example, a rating of value and/or importance associated with the attack target.

One or more portions of the violation analysis module 154 can be included with the network monitor 152. For example, detection of an alert condition by the network monitor 152 can include applying, using hardware, software, or firmware, one or more filters used by the violation analysis module 154, and/or logic to the intercepted network traffic (copied or not copied) to detect an alert condition, identify a signature, and/or categorize the network threat, such as by determining a network policy that was violated.

In embodiments, the network monitor 152 notifies the violation analysis module 154 that an attack has been detected by sending an alert notification to the violation analysis module 154. The alert notification triggers the violation analysis module 154 to monitor the copied network traffic for violation of network policies.

In embodiments, the network monitor 152 intercepts the network traffic and copies the traffic, without performing analysis. The violation analysis module 154 continually monitors the copied network traffic for network threats, even without receiving an alert notification from the network monitor 152.

Furthermore, in embodiments, the network monitor 152 intercepts the network traffic without copying the network traffic. The violation analysis module 154 continually monitors the intercepted network traffic in order to detect and identify network threats (e.g., network policies), even without receiving an alert notification from the network monitor 152. In this scenario, the network monitor 152 merely provides a copy of the network traffic to the violation analysis module 154, and the violation analysis module 154 performs continual monitoring of the copied network traffic.

The GUI module 156 receives user selections, which can be entered by a user that interacts with interactive display elements included in a display generated by the GUI module 156. The user selections can be entered by any user interface associated with a user input device, such as a keyboard (physical or virtual), position tracking device (e.g., mouse), touch screen, microphone, etc.

The user selections can specify criteria, including characteristics of network traffic and/or network threats to analyze and/or display. The user selections can include, for example, selected policy violations or selected groups of policy violations. In addition, the user selections can include a selected time window, one or more selected protected hosts 104 or ports, one or more selected external hosts 114 or ports, and/or direction of traffic (inbound and/or outbound). Furthermore, user selections can include a selected severity (e.g., high, medium, or low); groups of severity (e.g., a group of two or three of high, medium, or low); geolocation of a source or destination host; identification of an authenticated user sending a transmission; a host domain that is resolved from an internet protocol (IP) using a domain name server (DNS); source IP address; destination IP address; one or more traffic characteristics, such as volume or other metrics; and one or more policy characteristics.

The GUI module 156 further receives in real time, or near real time, the traffic metric data, alert data, and violation data, and outputs a GUI that includes a graphical display based on the user selections. The GUI displays both the traffic metric data, alert data, and violation data along the same timeline so that a user viewing the GUI can observe correlations between detected network threats and traffic flow. The GUI module 156 can monitor network performance by continuing to update the GUI in real time, or at regular intervals in near real time (e.g., each minute), based on the received traffic metric data, alert data, violation data, and user selections. Accordingly, a user viewing the GUI can observe changes in network traffic and detected alerts in real time or near real time.

Figure 2:
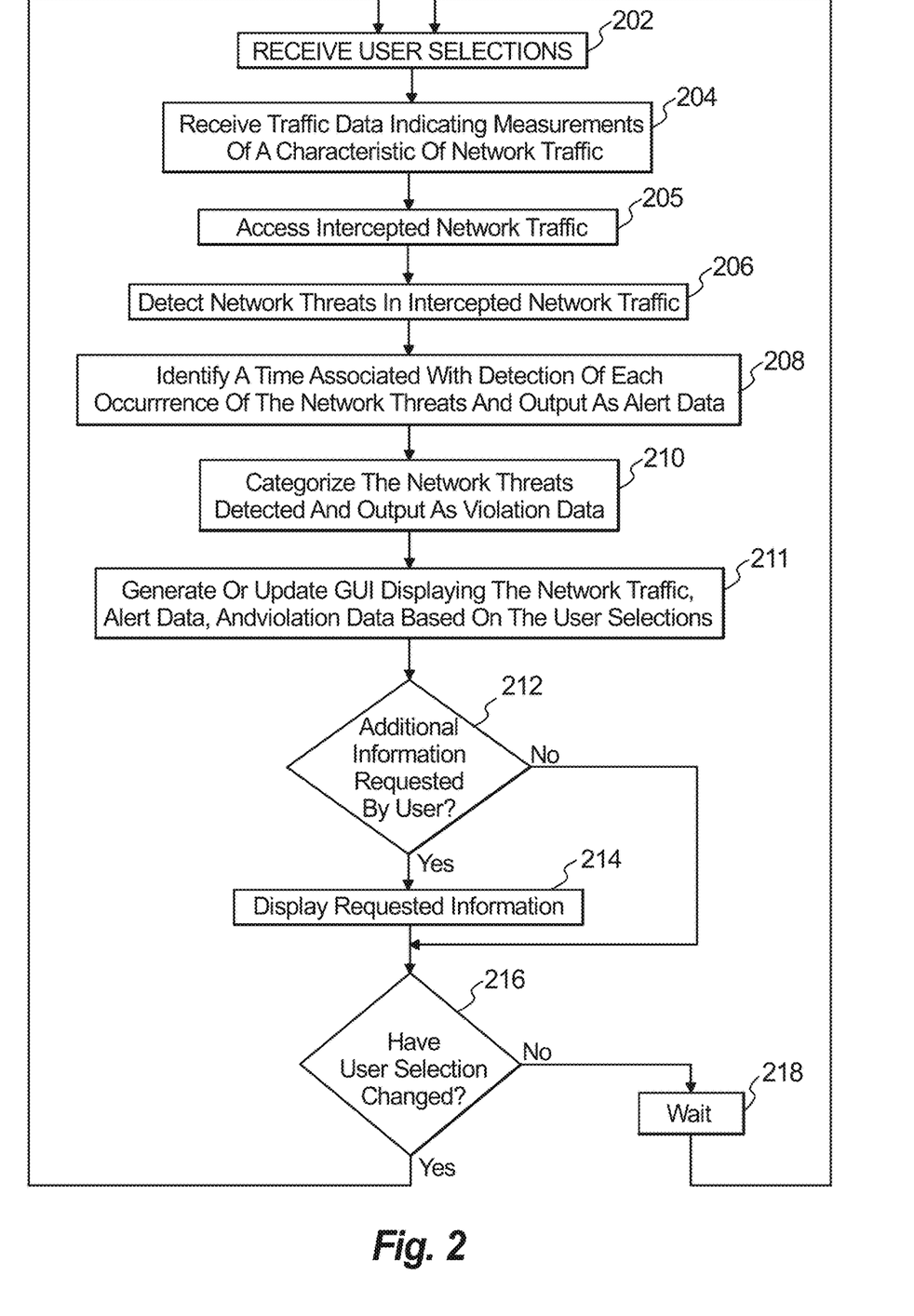
FIG. 2 is a flowchart of operations performed for presenting graphical visualization of network monitoring, in accordance with the present disclosure.

FIG. 2 is a flowchart of operational operations performed by embodiments of the protection system 150 for displaying a graphical representation of user selected traffic and violation information, in accordance with an illustrative embodiment of the present disclosure. Before turning to descriptions of FIG. 2, it is noted that the flow diagram shown therein is described, by way of example, with reference to components shown in FIG. 1, although these operations may be carried out in any system and are not limited to the scenario shown in the aforementioned figures. Additionally, the flow diagram in FIG. 2 shows examples in which operations are carried out in a particular order, as indicated by the lines connecting the blocks, but the various operations shown in these diagrams can be performed in any order, or in any combination or sub-combination. It should be appreciated that in some embodiments some of the operations described below may be combined into a single operation. In some embodiments, one or more additional operations may be included.

It should be noted that throughout this description, in one embodiment, the protection system 150 may be standalone and may receive data from log files (e.g., security logs) associated with nodes in a computer network (e.g., computers, routers, switches etc.), auditing events collected via nodes associated with the computer network, stored traffic uploaded from files and sniffing real-time network traffic that flows in the computer network. Furthermore, the protection system 150 may be implemented as a gateway/proxy server filtering network traffic according to its decisions.

FIG. 2 illustrates embodiments of an example method for presenting graphical visualization of user selected violation and traffic information. The method is further described in conjunction with computer display screen shots shown in FIGS. 3-5, which can be generated by the GUI module 156.

Starting at operation 202, user selections are received, e.g., via the GUI interface 156. For example, the user selections can include selections of policy violations or selected groups of policy violations, a selected time window (e.g., a selected number of minutes, hours, days, or months), one or more selected protected hosts or ports, one or more selected external hosts or ports, and/or direction of traffic (inbound and/or outbound). Groups of hosts can be selected based on criteria specified by the user, such as geographic location, organizational group, IP address range, etc. The user selections can be prompted via the GUI. When a user selection is not entered, default selections can be used. Data about a group (e.g., of policy violations, protected hosts or ports, external hosts or ports, or direction of traffic) can be aggregated based on the user selections or default selections. All such customization information may be stored on the storage medium in association with a user id identifying a single user, a group of users, or provided as one or more defaults.

At operation 204, traffic metric data is received, e.g., from the network monitor 152 shown in FIG. 1. The traffic metric data indicates measurements of a characteristic of network traffic, such as volume of inbound and outbound network flow. At operation 206, a network threat is detected in intercepted network traffic. In an example, the network monitor 152 can intercept network traffic and detect an alert condition in the intercepted traffic, upon which the network monitor 152 can transmit notification of the alert condition to the protection system 150 of FIG. 1. The network monitor 152 upon detecting the network threat can also provide a copy of intercepted network traffic to the protection system 150.

At operation 205, intercepted network data is accessed. At operation 206, a time associated with detection of each occurrence of a network threat is identified and output as alert data. In embodiments, the alert notification can indicate the time at which the network threat was detected. In further embodiments, the time at which the network threat was detected can be based on detection of the network threat by the violation analysis module 154 if the protection system 150 of FIG. 1.

At operation 208, the network threats detected are categorized and the information about the categorization is output as violation data. In embodiments, the traffic metric data, copied intercepted network traffic and/or associated alert data are analyzed to determine the network threat, such as to detect a signature. The categorization can include determining which network policies were violated, such as by applying one or more filters. Thus, a determination can be made as to which network threat was detected, e.g., which network policy was violated based on the detected signature. The categorization of the network threats is output as violation data. The violation data can also include a severity level (e.g., low, medium, high, without limitation to a particular categorization scheme) of the network threats detected, such as based on analysis of the traffic metric data, copied intercepted network traffic, associated alert data, and/or violation data. For example, the severity level can be based on the frequency of the network threat being detected as the network traffic flows.

At operation 211, a GUI is generated or updated that includes a graphic display with a traffic and violation plot of the traffic metric data, alert data, and violation data. The graphic display is based on the user selections that were received, such as to display data associated with a selected time window, a selected protected host 104 or external host 106 or group of hosts, a selected network threat, e.g., violation, or group of network threats, or network threats having a selected severity level. Screen shots shown in FIGS. 3-5, discussed further below, illustrate different examples of traffic and violation plots. The GUI can be generated during a first iteration of operation 211 and updated during subsequent iterations.

At determination operation 212, the GUI module 156 can periodically check if any additional information was requested by the user in an interactive manner, such as by activating an interactive element of the GUI. If a determination was made that such information was requested (as indicated by the YES branch at determination operation 212) and is available, the GUI module 156 provides the information for display to the user at determination operation 212 via one or more visualization elements described below in conjunction with FIGS. 3-5. If the requested information is not available, the GUI module 156 can request that the violation analysis module 154 locate, determine, aggregate, and/or analyze the appropriate data by communicating with other components of the protection system 150 prior to presenting the requested data to the user.

If the determination at operation 212 is that information was not requested, or the information requested is not available, the method continues at determination operation 216. At determination operation 216, the GUI module 156 may periodically determine whether the user selections have been updated in an interactive manner, such as by activating an interactive element of the GUI. If the determination at operation 216 is YES, the method continues at operation 202 to receive the new user selections. If the determination at operation 218 is NO, the method continues, in embodiments, at wait operation 218 in order to wait a wait interval (e.g., 20 seconds or one minute) before receiving data and updating the GUI. When the wait interval has been completed, the method continues at operation 202. In embodiments, the user selections, traffic metric data and/or intercepted network data are received in real time, and wait operation 218 includes waiting until at least one of updated user selections, traffic metric data, and/or intercepted network data are available and continuing at operation 202, 204, or 205 to receive the user selections, traffic metric data, and/or intercepted network data in real time. FIGS. 3, 4A-4C, and 5 illustrate various computer display screens generated by the GUI module 156 in accordance with embodiments of the present disclosure. Features of the displays are responsive to interaction with a user.

Figure 3:
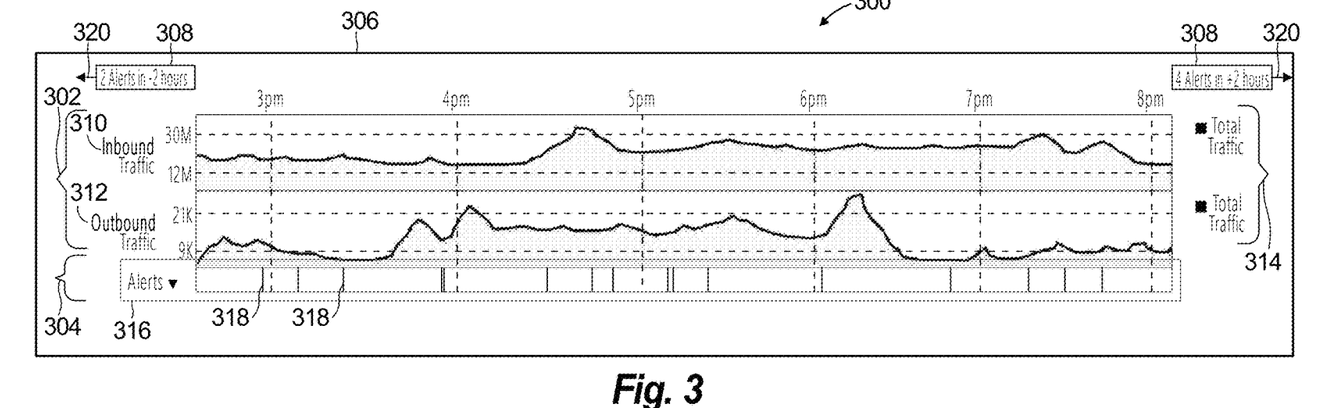
FIGS. 3-5 illustrate various computer display screens generated by embodiments of the present disclosure.

FIG. 3 illustrates a display screen 300 having a traffic information plot 302 and a violation information plot 304. A timescale 306 is provided that is applied to both of the traffic information plot 302 and the violation information plot 304. In the example shown, the timeline 306 indicates a series of two hour increments.

At either end of the timescale 306 is a preview indicator 308 that indicates a preview alert count of an adjacent time increment in either a backward or forward direction relative to the timescale 306. For example, the preview indicator 308 positioned at the left side of the display screen 300 indicates a number of alerts detected in a previous time interval. In the example shown in FIG. 3, the preview indicator 308 indicates "2 alerts in −2 hours," which indicates that 2 alerts were detected in the previous time interval of two hours. Additionally, the preview indicator 308 positioned at the right side of the display screen 300 indicates a number of alerts detected in a next time interval. In the example shown in FIG. 3, the preview indicator 308 indicates "4 alerts in +2 hours," which indicates that 4 alerts were detected in the next time interval of two hours.

The timeline 306 can be adjusted to have longer or shorter time intervals. While in the example shown, the time intervals are shown as 2 hour intervals, these intervals can be adjusted to a different number of hours, or a selected number of a different time increment, such as minutes, days, weeks, or months. When the time intervals are increased, data displayed can be aggregated for displayability and clarity. Additionally, the next or previous time interval represented by preview indicator 308 can be a different time interval than the interval used for the timeline 306. For example, in the example shown, the next or previous time interval can be one hour (for showing expanded data), or 10 hours or one day (for showing compressed data).

The traffic information plot 302 includes an inbound plot 310 and an outbound plot 312 that show volume of traffic relative to time, wherein the vertical axis corresponds to volume and the horizontal axis corresponds to time. The traffic information plot 302 further includes a key provided in key area 314 that explains an aspect of the traffic that is represented by the inbound plot 310 and outbound plot 312. In the example shown, the key indicates that the inbound plot 310 and the outbound plot 312 represent total traffic for each plot.

Using interactive display elements (not shown), a user may select one or more host subsets of one or more hosts included in a total collection of hosts that are, in combination, sending or receiving the total traffic shown in the inbound plot 310 and outbound plot 312. Each host subset selection may be plotted with a unique indicator, such as a unique color relative to the other plots. The key may indicate the color that corresponds to each host subset. Additionally, a selected host subset can be highlighted.

In addition, a user may select one or more policy subsets of one or more policies included in a total collection of policies that are violated, in combination, in the total traffic shown in the inbound plot 310 and outbound plot 312. Each policy subset selection may be plotted with a unique indicator, such as a unique color relative to the other plots. The key may indicate the color that corresponds to each policy subset. Additionally, a selected policy subset can be highlighted.

The GUI displayed on display screen 300 can include interactive display elements (not shown) that a user can activate (e.g., on or hover over) to interactively select host and policy subsets, or other subsets of data. The GUI displayed on display screen 300 can also be interactive with other GUIs provided by the GUI module 156 in one or more different display screen (not shown). For example, FIGS. 3, 4A-4C, 5A, and 5B of U.S. Patent Application entitled VISUALIZATION OF TRAFFIC FLOWING THROUGH A HOST, to the same Assignee as the current Application and filed concurrently herewith, which is incorporated herein by reference in its entirety, can include interactive display elements that interact with the GUI displayed in display screens 300, 400, and 500 of FIGS. 3, 4A, 4B, 5A, and 5B. For example, a user can activate a link displayed as an interactive display element of the Sankey diagram shown in FIG. 3 of U.S. Patent Application entitled VISUALIZATION OF TRAFFIC FLOWING THROUGH A HOST, which can cause traffic associated with that link to be highlighted, wherein the highlighted traffic that has been determined to violate one or more policies can be displayed so that each policy or selection of one or more policies is displayed in a unique color.

The violation information plot 304 includes a horizontal bar 316 that uses the same timeline 306 along its horizontal axis. Vertical alert tick marks 316 are plotted in the horizontal bar 316 along the horizontal axis, with each alert tick mark 316 positioned at a time when a network threat was detected, e.g., a policy was determined to be violated.

Alert tick marks 316 can be displayed that are associated with one or more selected network threats only. The selected network threats can be specified by the user selections. In embodiments, the time at which the alert tick ark 316 is positioned is the time at which the network threat was first detected. The alert tick marks 316 can be provided with a graphic indicator that indicates a severity of the corresponding violation. For example, the graphic indicator can be a color or grayscale of the alert tick marks 316. In embodiments, the graphic indicator can be a line type (e.g., dashed, dotted, etc.) or thickness.

Display screen 300 can be adjusted based on input user selections, such as which network threats are presented in the violation information plot 304, time intervals used for the timeline 306, which aspects of the traffic are represented in the inbound plot 310 and outbound plot 312, whether the violation information plot 304 represents violations that occur in inbound or outbound traffic or both.

The display screen 300 can be interactive, allowing a user to enter user selections by clicking on display elements, such as preview indicators 308. Clicking on the preview indicators 308 can cause the traffic information plot 302 and the violation information plot 304 to display data associated with a selected time interval. For example, clicking the preview indicator 308 positioned at the left side of the display screen 300 can cause data associated with a previous time interval to be displayed, and clicking the preview indicator 308 positioned at the right side of the display screen 300 can cause data associated with a next time interval to be displayed, allowing a user to scroll backwards and forwards through time.

In some embodiments, the data to plot on the traffic information plot 302 and the violation information plot 304 for a previous or next time interval may not yet be available to the protection system 150. In these embodiments, the protection system 150 can communicate with the network monitor 152 and/or access data from a storage area accessible to the protection system 150 to obtain the data.

Figure 4A:
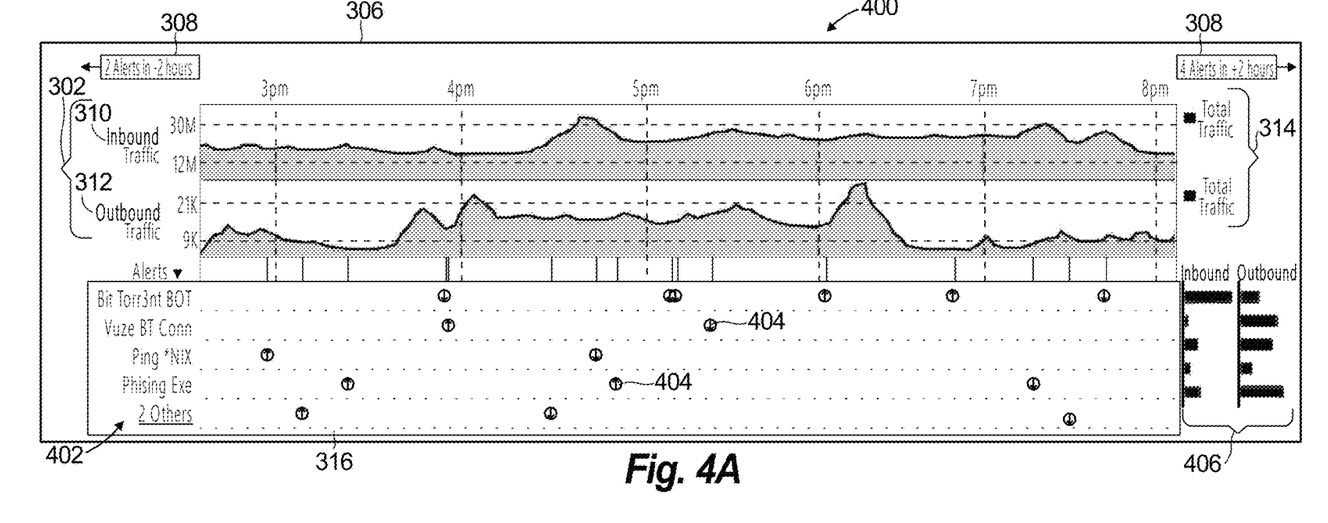

FIG. 4A illustrates a display screen 400 having the traffic information plot 302 and violation information plot 304 plotted using the same timescale 306. In the example shown, the timeline 306 indicates a series of one hour increments, but is not limited to a particular time increment.

At either end of the timescale 306, preview indicators 308 indicate a preview alert count of an adjacent selectable time increment in either a backward or forward direction relative to the timescale 306. In the example shown in FIG. 4, it is pointed out that the preview indicator 308 on the left and right side of the display screen 400 indicate alert counts for the same previous and next time intervals as shown in FIG. 3, even though the timelines shown in FIG. 3 and FIG. 4A use different time intervals.

The traffic information plot 302 includes inbound and outbound plots 310, 312 and a key provided in key area 314. The violation information plot 304 includes a horizontal bar 316 that uses the same timeline 306 along its horizontal axis. The horizontal bar 316 further includes a vertical axis that indicates different threat categories. Alert indicators 404 are plotted in the horizontal bar 316 along the horizontal and vertical axes, with each alert indicator 404 positioned along the horizontal axis at a time when a selected network threat was detected (e.g., first detected), and along the vertical axis in a row that indicates a threat category to which the detected network threat was determined to belong. In embodiments, the network threat is a detected violation of a network policy.

The alert indicator 404 can be provided with a graphic indicator that indicates a severity of the corresponding violation and/or a direction (e.g., inbound or outbound) of the network traffic in which the network threat was detected. For example, the graphic indicator that indicates severity can be a color or grayscale of the alert indicator 404, a shape, size, or fill type (such as striped, hashed, solid). In embodiments, the graphic indicator can be a line type (e.g., dashed, dotted, etc.) or thickness. The graphic indicator that indicates can include, for example, an arrow, such that the direction in which the arrow points indicates the direction of the network traffic in which the network threat was detected.

The traffic information plot 302 further includes a second key provided in second area 406 that explains an aspect of the detected network threats relative to the traffic represented by the inbound plot 310 and outbound plot 312. In the example shown, the second key includes inbound and outbound bars of a bar graph that each correspond to a row of the alert indicators 404. The length of each bar represents a proportion of traffic associated with the alert indicators 404 in that row relative to the corresponding total inbound or outbound traffic displayed in the inbound or outbound blots 310, 312.

The bars show the relationship between inbound and outbound traffic for each row. The graphically displayed information in area 406 assists an analyst to understand the proportion of network traffic associated with alert indicators 404 in each row for each direction, relative to alert indicators 404 in other rows and relative to total network traffic.

The display screen 400 can be adjusted based on input user selections, such as which network threats are presented in the violation information plot 304, time intervals used for the timeline 306, which aspects of the traffic are represented in the inbound plot 310 and outbound plot 312, whether the violation information plot 304 represents violations that incur in inbound or outbound traffic or both. The user selections can be input using interactive display elements, such as preview indicators 308.

Figure 4B:
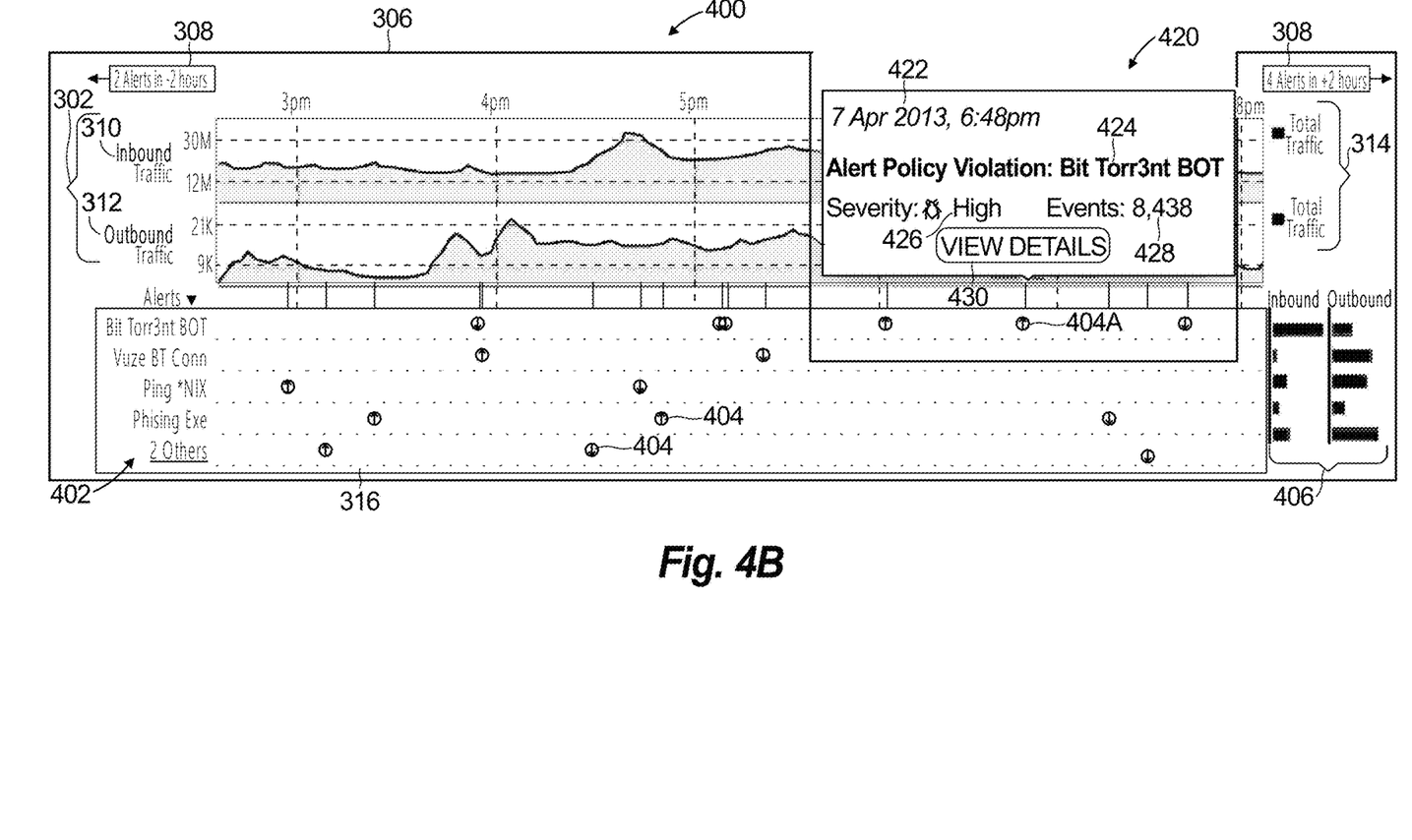
Figure 4C:
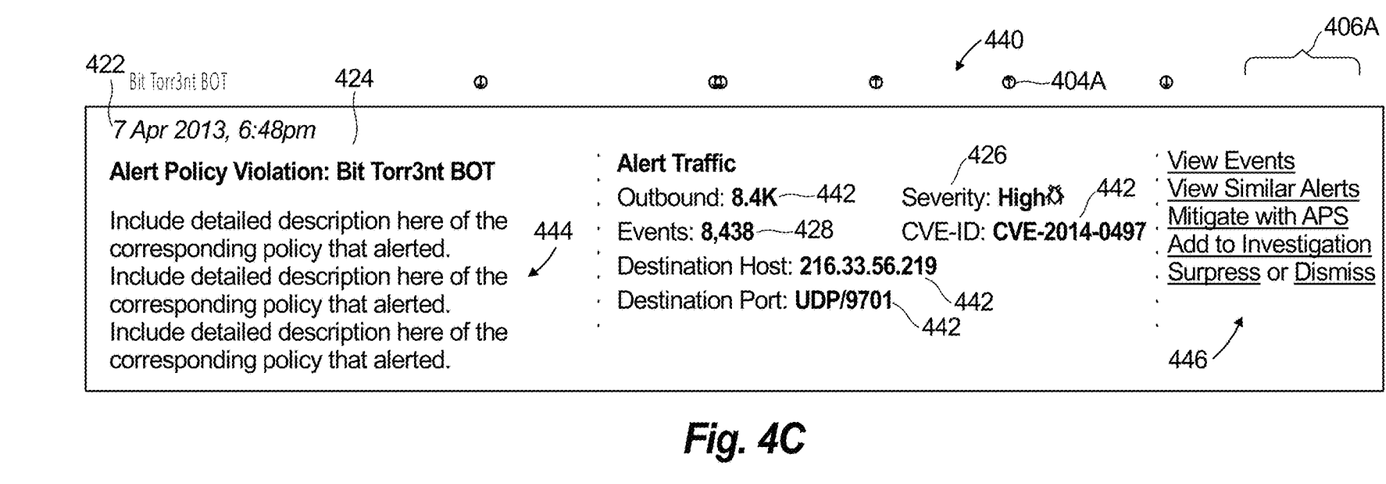

As shown in FIGS. 4B and 4C, a user can request that additional data be displayed about a particular interactive display element by activating the interactive display element, such as by clicking on or hovering over the display element (e.g., using a mouse), touching the display element (e.g., using a touch screen), or pointing at the display element (e.g., using a three-dimensional touch screen or operating a cursor). The additional data displayed may depend upon the type of activation used for activating the interactive display element (e.g., clicking versus hovering, each causing a display of different additional data to be displayed).

With reference to FIG. 4B, the display screen 400 is shown with a pop-up window 420 that was triggered to pop up by activation of a particular alert indicator 404A, wherein the displayed alert indicators 404 are interactive display elements. The pop-up window 420 includes a time stamp 422 that indicates the time at which the associated network threat was first detected (e.g., by the network monitor 152 or by the protection system 150), the name of a network policy that was violated 424, a severity level 426, and a number of events 428, which refers to the number of times the corresponding policy has been violated based on criteria designed to aggregate similar violations. For example, each consecutive violation occurring within a close time period and with similar features may be aggregated under a single policy alert.

With reference to FIG. 4C, the display screen 400 is shown with an information bar 440, which is displayed in response to activation of alert indicator 404A. The information bar 440 includes additional information 442, which can be in addition to time stamp 422, the name of a network policy that was violated 424, a severity level 426, and a number of events 428 that occurred. The further information can include, for example, a direction of traffic the network threat was first detected in, an address of a destination host or port, and a CVE-ID. In addition, a description 444 of the policy violated by the network threat can be provided, and a menu bar 446 with interactive display elements that can be activated to perform a variety of tasks, such as view events, view similar alerts, mitigate one or more network threats with a threat management system, open an investigation or add the alert indicator 404A to an investigation, and suppress or dismiss the alert indicator 404A.

In some embodiments, when data requested by user selections or user interaction is not available to the protection system 150 at that time, the protection system 150 can communicate with the network monitor 152 and/or access data from a storage area in order to access the requested data.

Figure 5:
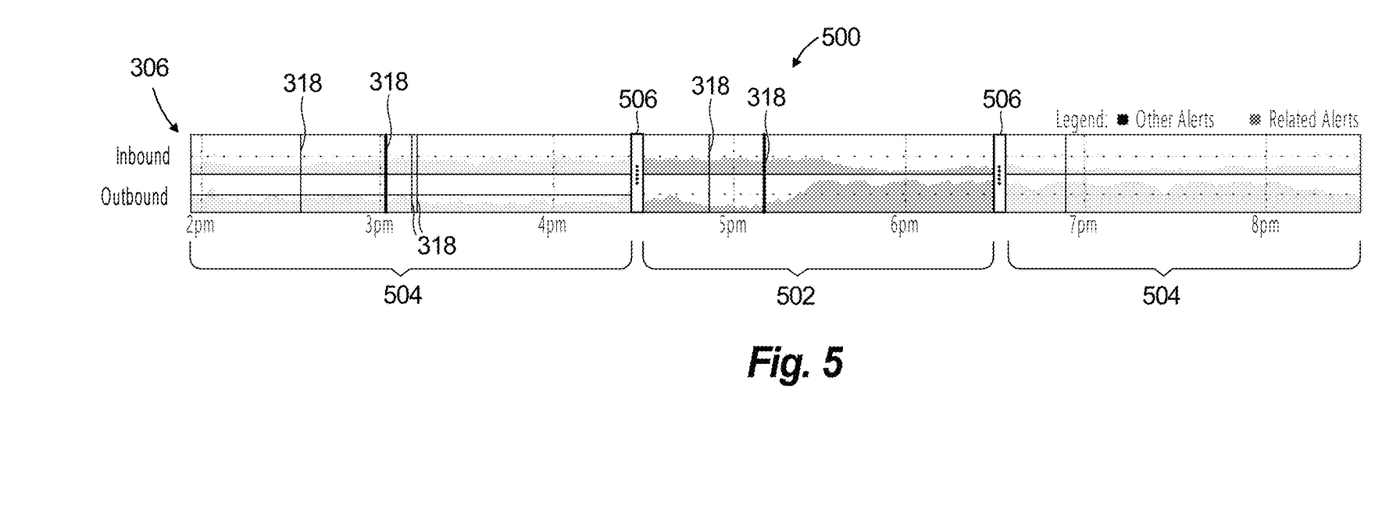

With reference to FIG. 5, a display screen 500 is shown having the traffic information plot 302, including inbound plot 310 and outbound plot 312. In the example shown, the timeline 306 indicates a series of one hour increments, but is not limited to a particular time increment. The timeline 306 includes a first time portion 502 corresponding to a first time period and at least one second time portion 504 corresponding to at least one respective second time period.

In embodiments the first time period can be adjacent to at least one of the second time periods, so that together the first time period and at least one of the second time periods describe a continuous time period, with each of the at least one second time periods being directly before or after the first time period. In embodiments, the first and second time periods can be nonadjacent and describe disjoint or overlapping time periods.

The duration of the first and second time periods can be selectable, such as by a user or an administrator. The display 500 includes one or more timeline controls 506 that are interactive display elements that can be slid to the left or right to adjust at least one end of the first and second time portions 502, 504 and thereby adjust the time period of the corresponding first and/or second time portion 502, 504.

The time scales associated with each of the first and second time portions 502, 504 can be selectable. The first and second time periods can have different time scales. For example, the second time periods can be compressed relative to the first time period. The display can include interactive display elements that can be activated to select the respective time scales. For example the timeline 306 can be interactive, such as by right-clicking on the portion of the timeline 306 that corresponds to the time portion (502 or 504) in order to adjust the time scale of the corresponding time period.

In embodiments, the network traffic plot 310 and/or the alert plot 310 associated with the first timeline portion 502 include interactive display elements that can be activated to request information or enter user selections, whereas the second timeline portion is provided only to display information, but without any interactive capabilities. The display can visually indicate which elements do, or do not, have interactive capabilities, such as by graying-out those elements that do not have interactive capabilities.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the protection system 100 may be implemented or executed by one or more computer systems. For example, protection system 100 can be implemented using a computer system such as example computer system 602 illustrated in FIG. 6. In various embodiments, computer system 602 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Figure 6:
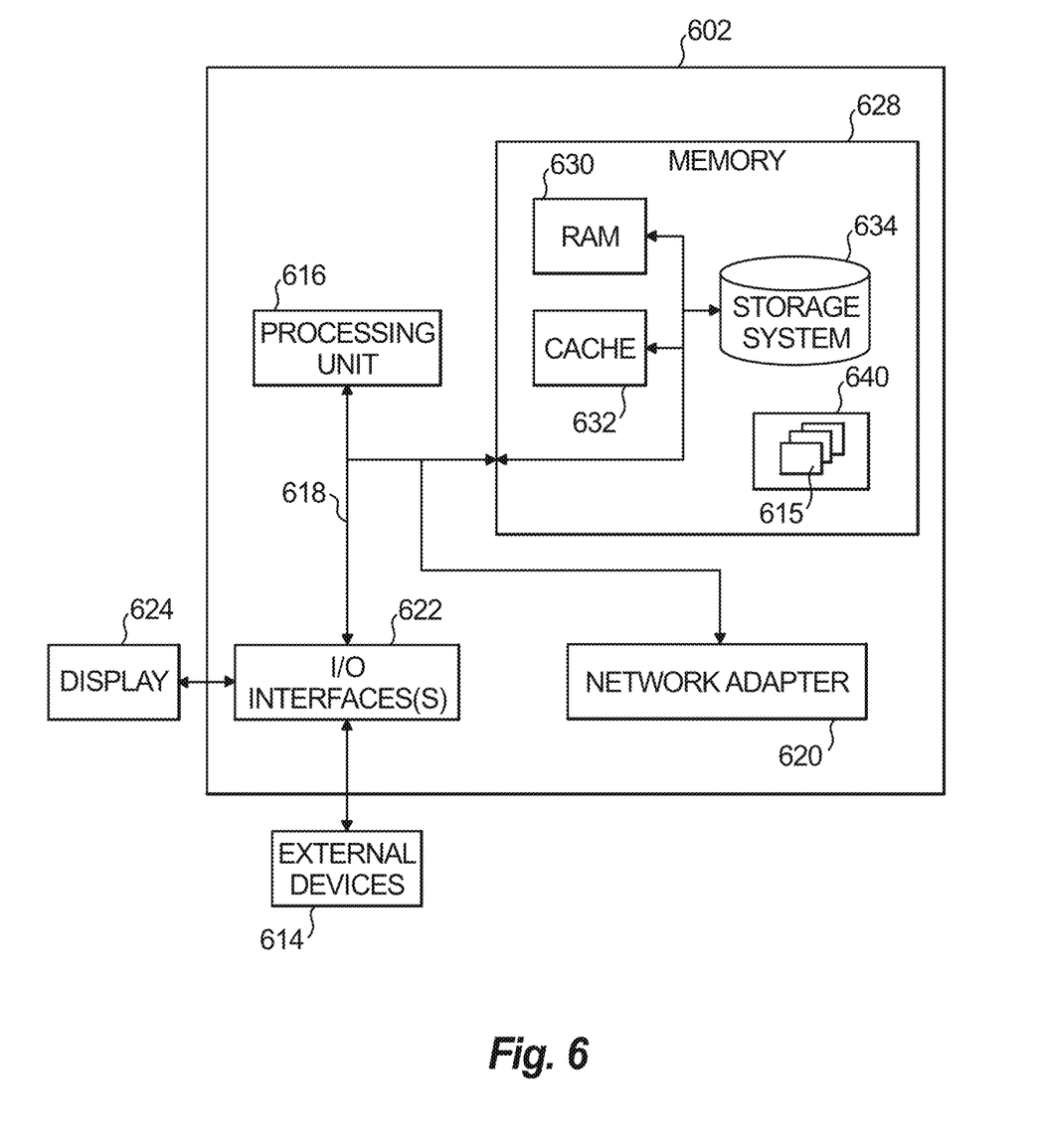
FIG. 6 illustrates a computer system used to implement the protection system illustrated in FIG. 1.

Computer system 602 is only one example of a suitable system and is not intended to suggest any limitation as to the scope of use or functionality of embodiments of the disclosure described herein. Regardless, computer system 602 is capable of being implemented and/or performing any of the functionality set forth hereinabove.

Computer system 602 may be described in the general context of computer system-executable instructions, such as program modules, being executed by a computer system. Generally, program modules may include routines, programs, objects, components, logic, data structures, and so on that perform particular tasks or implement particular abstract data types. Computer system 602 may be practiced in distributed data processing environments where tasks are performed by remote processing devices that are linked through a communications network. In a distributed data processing environment, program modules may be located in both local and remote computer system storage media including memory storage devices.

Computer system 602 is shown in FIG. 6 in the form of a general-purpose computing device. The components of computer system 602 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 602 typically includes a variety of computer system readable media. Such media may be any available media that is accessible by computer system 602, and it includes both volatile and non-volatile media, removable and non-removable media.

System memory 628 can include computer system readable media in the form of volatile memory, such as random access memory (RAM) 630 and/or cache memory 632. Computer system 602 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615, such as computer system 602, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 602 may also communicate with one or more external devices 614 such as a keyboard, a pointing device, a display 624, etc.; one or more devices that enable a user to interact with computer system 602; and/or any devices (e.g., network card, modem, etc.) that enable protection system 100 to communicate with one or more other computing devices. Such communication can occur via Input/Output (I/O) interfaces 622. Still yet, computer system 602 can communicate with one or more networks such as a local area network (LAN), a general wide area network (WAN), and/or a public network (e.g., the Internet) via network adapter 620. As depicted, network adapter 620 communicates with the other components of protection system 100 via bus 618. It should be understood that although not shown, other hardware and/or software components could be used in conjunction with computer system 602. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the protection system 100 include interactive, graphical display, via a GUI, of network traffic flow characteristics in relation to detected network threats, all using a common timeline. The display can group information together as specified by a user, such as by changing time scale, grouping hosts, or grouping categories of network threats. By grouping, the display can manage large amounts of information, such as associated with networks having a large number of hosts. User input, which can be provided via interactive display elements of the GUI, can be used to alternate between a detailed display of a selected relatively small set of data and a selectively compressed display associated with a relatively large set of data.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method for providing an interactive graphical user interface for monitoring network traffic, the method comprising:

receiving traffic metric data indicating measurements related to a characteristic of network traffic flowing in a network;

identifying network threats in intercepted traffic of the network traffic;

identifying a time associated with detection of each occurrence of the network threats; and generating a graphical user interface having a GUI that includes a display of a time series graph that corresponds to a selected time period, the display including a network traffic plot and an alert plot adjacent to the network traffic plot, the network traffic plot indicating a characteristic of network traffic relative to a timeline displayed along a first axis including an inbound plot associated with incoming network traffic and an outbound plot associated with outbound network traffic, the alert plot including alert indicators, each alert indicator associated with detection of a network threat and aligned relative to the timeline based on the time identified for each occurrence of the detected network threats wherein the alert indicators are interactive elements, the alert plot further including a vertical axis that indicate different network threat categories and a horizontal time line axis extending from each threat category whereby alert indicators are positioned along a horizontal time line axis extending from an alert category positioned along the vertical axis to which each alert indicator is to indicate both a time occurrence and alert category based on graph position, each alert indicator also being provided with a graphic indicator indicating a severity of a threat violation relative one another; and generating an interactive popup window on the display responsive to user activation of a selected displayed alert indicator wherein the popup window includes: a time stamp indicating a time which a network threat associated the user selected alert indicator was detected and a name of a violated network policy associated with the network threat.

2. The method of claim 1 further comprising:

categorizing each of the identified network threats in a threat category of a plurality of threat categories based on monitoring of the network traffic; and aligning the plotted alert indicators along a second axis that corresponds to a series of the plurality of threat categories, each of the threat categories corresponding to a different location on the second axis, wherein the respective alert indictors are aligned along the second axis based on the threat category to which the associated detected network threat is categorized.

3. The method of claim 1, wherein the timeline includes a first timeline portion and a second timeline portion, and wherein the first timeline portion has a first time scale and corresponds to a first time period, and the second timeline portion has a second time scale different than the first time scale and corresponds to a second time period different than the first time period.

4. The method of claim 1, wherein the generated popup window further includes indication of a number of events for which the violated network policy has occurred.

5. The method of claim 4, wherein the generated popup window further includes an interactive icon which generates a second popup window on the display responsive to user activation of the interactive icon wherein the second popup window includes a direction of traffic the network threat was first detected.

6. The method of claim 5, wherein the generated second popup window further includes an address of a destination host or port associated with the network threat.

7. The method of claim 6, wherein the generated second popup window further includes a description of the violated network policy threat and a menu bar with one or more interactive display elements regarding user selected one or more tasks to be performed associated with the violated network policy.

8. The method of claim 7, wherein the one or more tasks includes mitigating one or more network threats with a threat management system.

* * * * *